Jan. 18, 1966  G. A. NORRELGEN  3,230,448

IMPEDANCE MEASURING BRIDGE CIRCUIT

Filed Sept. 21, 1962

INVENTOR
GUNNAR A. NORRELGEN

BY Larson and Taylor
ATTORNEYS

United States Patent Office 3,230,448
Patented Jan. 18, 1966

3,230,448
IMPEDANCE MEASURING BRIDGE CIRCUIT
Gunnar August Norrelgen, Lidingo, Sweden, assignor to AGA Aktiebolaget, a corporation of Sweden
Filed Sept. 21, 1962, Ser. No. 225,434
2 Claims. (Cl. 324—57)

The invention relates to a bridge circuit for measuring an impedance which is equivalent to the parallel connection of a resistor, a capacitor and a dissipative series resonant circuit. Representative examples of this general type circuit are piezo-electric, magnetostrictive or ceramic resonators.

A piezo-electric resonator may be used as the frequency control element of an oscillator circuit. In order to predict the crystal's behaviour in the oscillator circuit, it is highly important to establish the parameter values of it at the fundamental frequency or the harmonic which is to be used.

An object of the invention is to provide a bridge circuit enabling a complete determination of the parameters of an impedance such as a piezo-electric crystal and also of its parasitic resonances.

In a priorly known bridge circuit for measuring an impedance of the type under consideration, one branch of the bridge is adapted to have the impedance connected in parallel therewith and comprises an adjustable resistor in parallel with an adjustable capacitor. The opposite branch of the bridge has the series connection of a resistor with an adjustable capacitor, whereas the third branch is a resistor and the fourth branch a capacitor. With this circuit, it is possible to determine the parallel resistance and the parallel capacitance of the impedance. It is also possible to make measurements from which the resistance representing the losses of the series resonant circuit of a crystal impedance may be determined. However, the circuit does not lend itself to a rapid and simple determination of the inductance and the capacitance of the series circuit nor to establish possible parasitic resonances in a simple and rapid way.

According to the invention, the said opposite branch of the bridge circuit has in series with the elements referred to above the parallel combination of a resistor with an adjustable capacitor, a switch being provided for shorting the parallel combination and a further switch being provided for disconnecting the resistor. The last-mentioned switch may be adapted to connect any one of a plurality of resistors in the parallel combination.

Figure 1:
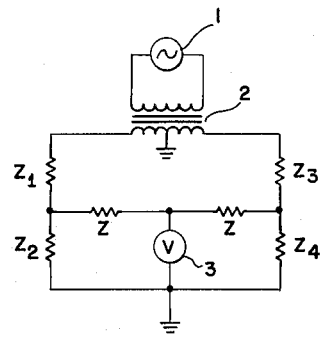
Figure 2:
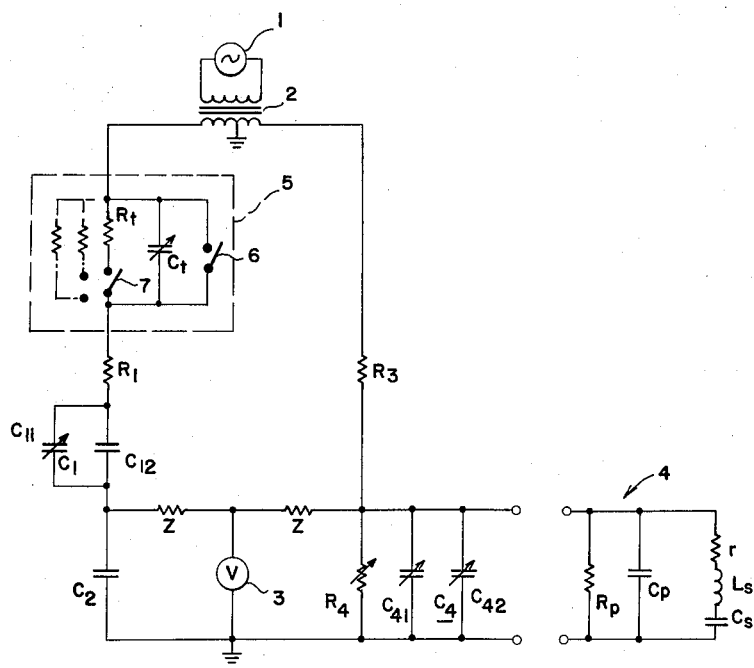

An embodiment of the invention is illustrated on the drawing, FIG. 1 of which is a circuit diagram illustrating the principle and FIG. 2 is the more detailed diagram of the embodiment.

In the bridge circuit of FIG. 1, the four branch impedances are $Z_1 \ldots Z_4$. Alternating current is applied from a voltage source 1 via a transformer 2, the secondary of which has its mid-point connected to ground. A voltmeter 3 is connected between the junction of impedances $Z_2$ and $Z_4$, which is also grounded, on the one hand and on the other hand the junction of a pair of series-connected like impedances Z which form one of the diagonals of the bridge. The condition for the bridge to be balanced is $Z_1 \cdot Z_4 = Z_2 \cdot Z_3$.

The FIG. 1 circuit is series-fed, equal voltages being applied to both sides of the bridge. However, the invention is applicable also to the kind of bridge in which parallel feeding is used, in which case voltage is applied to one of the diagonals, the voltmeter being in the other diagonal. The essential thing is that the four branches of the bridge are the impedances $Z_1 \ldots Z_4$. The crystal or other impedance to be measured is to be connected in parallel with the impedance $Z_4$.

As is apparent from FIG. 2, $Z_1$ is the series-connection of a block 5 which will be described later, a resistor $R_1$ and a capacitor $C_1$, the latter being composed of two parallel capacitors $C_{11}$ and $C_{12}$ for reasons which will be explained below. $Z_2$ is a capacitor $C_2$ and $Z_3$ is a resistor $R_3$. $Z_4$ is the parallel connection of a resistor $R_4$ and a capacitor $C_4$, which is composed in a similar manner to $C_1$ by two parallel capacitors $C_{41}$ and $C_{42}$. The impedance to be measured is designated 4 and, as shown, is adapted to be connected in parallel with $C_4$ and $R_4$. The unknown impedance is represented by the parallel combination of a resistor $R_p$, a capacitor $C_p$ and a dissipative series resonant circuit formed by elements $r$, $L_s$ and $C_s$.

The circuit formed by the elements enumerated but without including the elements within the block 5 of the drawing, which form the characteristic feature of the present invention, is priorly known and may be used to determine directly the values of $R_p$ and $C_p$. The procedure is as follows. Before the impedance 4 is connected to the circuit, the bridge is balanced with the aid of resistor $R_4$ and condenser $C_4$. The condition for balance is:

$$R_4 \cdot C_2 = R_3 \cdot C_1 \quad (1)$$
$$R_3 \cdot C_4 = R_1 \cdot C_2 \quad (2)$$

The impedance 4 is then connected to the bridge and the balanced condition is reestablished by adjustment of $C_1$ and $C_4$.

It is in this connection that it is practical to have $C_1$ and $C_4$ composed each of two parallel capacitors. Taking $C_4$ as an example, the first adjustment to be made with the impedance 4 disconnected is done with the aid of $C_{41}$. $C_{42}$ is used for the measurement proper and may be graduated directly in terms of the value sought for. It should be noted that the measurement takes place with the aid of a change in value for $C_4$ as well as $C_1$ to re-establish balance in the bridge after connection to it of the impedance 4, and the essential thing is to know the value by which these capacitors have changed. $C_{42}$ and in a similar manner $C_{11}$ have graduations and should be set at 0 and ∞, respectively, when the impedance 4 is disconnected. After connection of the impedance 4 in parallel with $C_4$, the changes brought about in the values of $C_4$ and $C_1$ take place by adjustment of $C_{42}$ and $C_{11}$ and, if these changes are designated $\Delta C_3$ and $\Delta C_1$, the conditions for balance of the bridge are:

$$\Delta C_1 = \frac{C_1}{1 + \frac{R_p}{R_3} \cdot \frac{C_2}{C_1}} \quad (3)$$

$$\Delta C_4 = -C_p \quad (4)$$

This presupposes that the frequency of the alternating voltage is substantially different from the resonant frequency of the series resonant circuit of the impedance 4, making the admittance of the series circuit have a negligible value.

It is apparent from these equations that $C_{11}$ and $C_{42}$ may be graduated in terms of $R_p$ and $C_p$, respectively.

As was mentioned above, this known bridge circuit does not make it possible to determine in a simple manner the value of $r$ and of $C_s$ of the impedance 4. To make possible such determination, the unit 5 is connected in the branch $Z_1$ of the bridge. It comprises an adjustable capacitor $C_t$ and a resistor $R_t$, as well as a switch 7 for disconnecting $R_t$ and the switch 6 for shorting the whole unit 5. As was pointed out above, the unit 5 may have a plurality of resistors similar to $R_t$ and which may be connected in circuit with the aid of the switch 7, as indicated with dash lines on the drawing.

The determination of $r$ and $C_s$ is made as follows:

The switch 6 is closed and the frequency of the alternating voltage applied to the bridge is varied until the reading of the voltmeter 3 is at a maximum. This means that the applied frequency is very close to the resonant frequency of the series circuit of the impedance 4. The switches 6 and 7 are then opened and the bridge is balanced by adjustment of the capacitor $C_t$ and, if required, by small adjustments of the frequency of the applied voltage. When balance has been restored, the frequency is equal to the resonant frequency $f_s$ of the series circuit and we have the condition for balance:

$$C_t \cdot R_3 = C_2 \cdot r \qquad (5)$$

It is clear that the capacitor $C_t$ may be graduated for reading off the value of $r$.

To determine $C_s$, the switch 7 is closed. The frequency of the applied voltage is again varied until the balance is restored. If the change in frequency required for this is $\Delta f$, we have the condition:

$$C_s = \frac{2\Delta f}{f_s} \cdot C_2 \cdot \frac{R_t}{R_3} \qquad (6)$$

Since $C_s$ may vary within wide limits, among other things in dependence upon which of the harmonics is being investigated, it is suitable for the unit 5 to comprise a plurality of resistors $R_t$.

The above procedures have led to the determination of $R_p$, $C_p$, $r$, $C_s$ and $L_s$ as is apparent from the above equations.

If it is desired to study possible parasitic resonances in the impedance 4, the switch 6 is closed and the frequency is varied within the range to be considered. The reading of the voltmeter 3 will then be a maximum at or very close to any resonant frequency of the impedance 4. The reading is a measure of a value of $r$ at the resonant frequency in question. If a more accurate determination of $r$ at these resonant frequencies is desired, it is possible to perform such determination in the manner described.

It should be noted in this connection that no approximations have been resorted to in the above balancing conditions, except for the disregarding of the series resonant circuit in connection with the determination of $R_p$ and $C_p$.

What I claim is:

1. Bridge circuit for measuring an impedance such as a piezo-electric, magnetostrictive or ceramic resonator represented by the parallel connection of a resistor, a capacitor and a dissipative series resonant circuit, the bridge circuit being adapted to have the impedance connected in parallel with one of the four branch impedances thereof, said one branch impedance comprising an adjustable resistor in parallel with an adjustable capacitor, and the opposite branch impedance comprising the series connection of a resistor and an adjustable capacitor, whereas the third branch impedance is a resistor and the fourth branch impedance a capacitor, there being provided in series with the said opposite branch impedance a unit comprising the parallel combination of a resistor with an adjustable capacitor, a switch being connected in parallel with said unit and a further switch being provided in series with the said resistor of said unit.

2. A bridge circuit as claimed in claim 1, in which said unit comprises a plurality of resistors connectable in parallel with said capacitor of said unit with the aid of said further switch.

References Cited by the Examiner
UNITED STATES PATENTS 2,376,394   5/1945   Sinclair   324—57
2,611,021   9/1952   Perls et al.   324—57 X WALTER L. CARLSON, *Primary Examiner.*